Dec. 31, 1957  G. BADALINI  2,817,954
HYDRAULIC CHANGE SPEED DEVICE
Filed July 13, 1954  8 Sheets-Sheet 1

INVENTOR
GIOVANNI BADALINI
ATTORNEYS

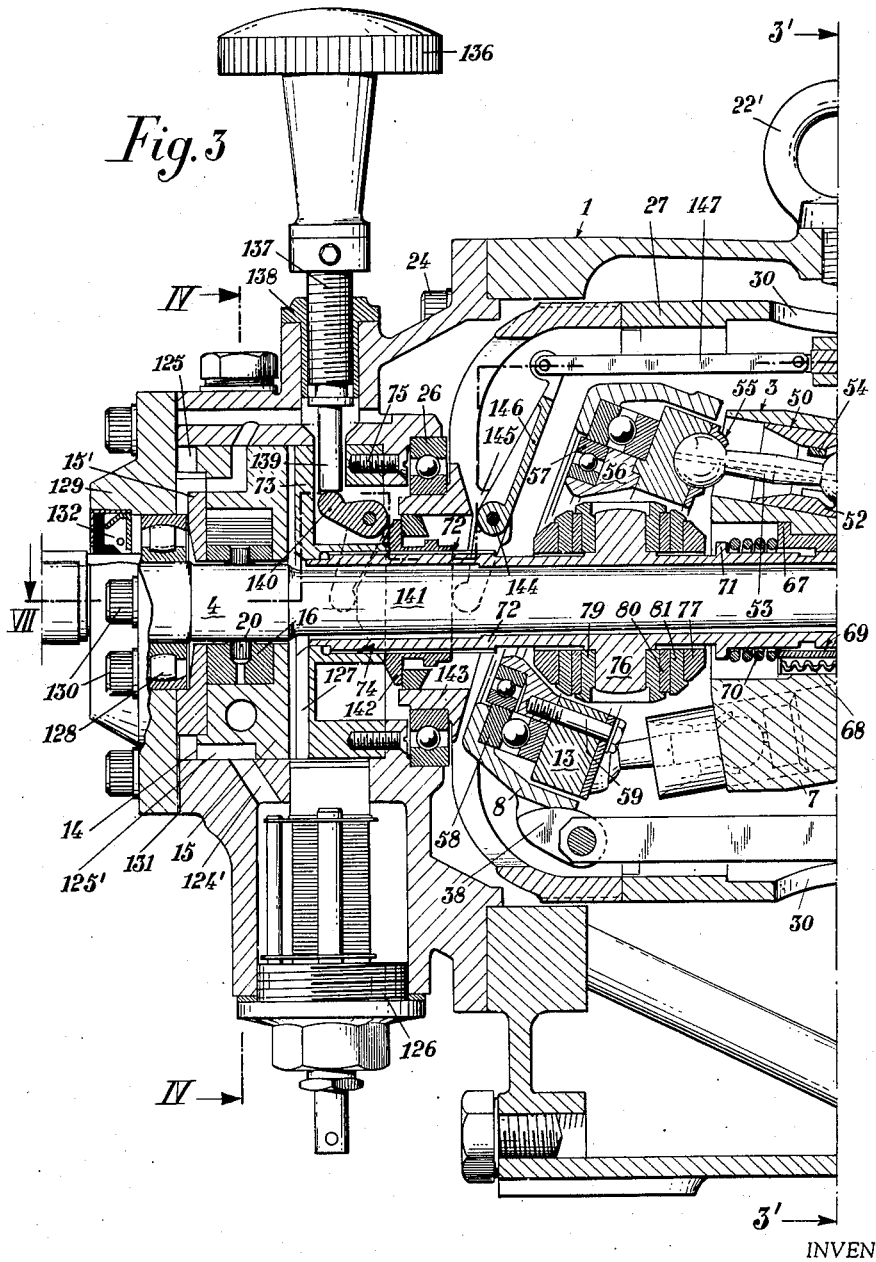

Dec. 31, 1957 G. BADALINI 2,817,954
HYDRAULIC CHANGE SPEED DEVICE
Filed July 13, 1954 8 Sheets-Sheet 3

INVENTOR
GIOVANNI BADALINI

ATTORNEYS

Dec. 31, 1957    G. BADALINI    2,817,954
HYDRAULIC CHANGE SPEED DEVICE
Filed July 13, 1954    8 Sheets-Sheet 6

INVENTOR
GIOVANNI BADALINI
BY
ATTORNEYS

United States Patent Office 2,817,954
Patented Dec. 31, 1957

2,817,954

HYDRAULIC CHANGE SPEED DEVICE

Giovanni Badalini, Rome, Italy, assignor to Cambi Idraulici Badalini S. p. A., Rome, Italy, a company of Italy Application July 13, 1954, Serial No. 443,073

Claims priority, application Italy May 21, 1954

4 Claims. (Cl. 60—53)

The present invention relates to a hydraulic change speed device, particularly for industrial uses.

It is known that it is desirable, for industrial uses, to provide a means whereby the movement supplied by an engine is transmitted to a machine at different rates of speed. This may be necessary when the machine is started, when for overcoming the inertia of said machine it is necessary to have an angular rate of speed which is less than the speed during the normal movement of the machine, or in order to slow down or to accelerate the operation of the machine, or for stopping the movement of the machine without at the same time stopping the engine.

The object of the present invention is to provide a transmission device permitting continuous variation of the ratio of the speeds between the input shaft and the output shaft of the device, so as to allow the variation of said ratio from a ratio of 1:1 up to a ratio of one to infinity, i. e. to the position wherein the driving shaft idles with respect to the driven shaft.

There is thus provided a hydraulic continuous change speed device, particularly for industrial use, which comprises a pump and a motor operated by a liquid medium comprising a plurality of pistons controlled by a plate which may be slanted, said pump and said motor being coaxially arranged on opposite sides of a central distributing plate, the pump being mounted adjacent the output shaft and being operated by the input or driving shaft, while the motor is held stationary by a reaction shaft surrounding the driving shaft, and acts on a movable case mounted for revolution with said slantable plates, a stationary case rotatably supporting at one end the output shaft which is connected rigidly to said movable case and at the other end both the input shaft and the other end of the movable case, a supplemental pump concentric with the driving shaft, said supplemental pump serving to maintain the hydraulic circuit under excess pressure at all times, and a servomotor for slanting said plates, the slanting of the plates being controlled from the outside of the stationary case by means of a hand wheel operating a jack fastened to the movable case, said jack ensuring an equilibrium position of a piston connected to the swash plate of the displacement pump for each position of the distributor plunger controlled by said hand wheel, said equilibrium position being automatically restored each time the members of the jack are subject to movement.

One preferred embodiment of this invention is shown in the attached drawings, wherein.

Figure 1:
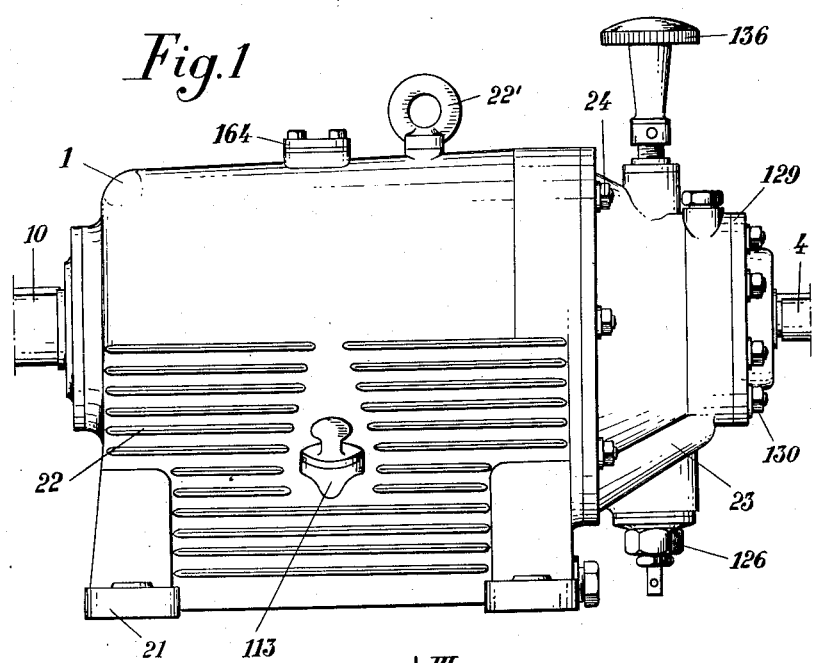
Fig. 1 is a side elevation view of the device.
Figure 2:
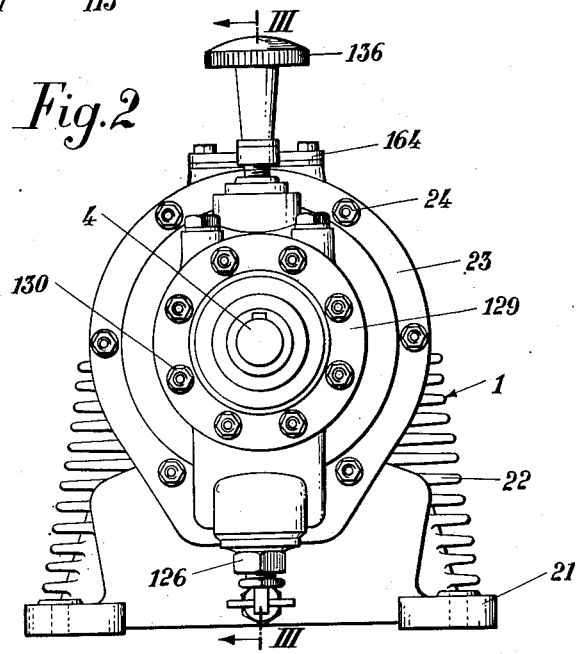
Fig. 2 is a front elevation view of the device, seen from the driving shaft end.

Referring to Figs. 1 to 7, within the case 1, which is of substantially cylindrical shape and which has a base platform 21, longitudinal cooling ribs 22 and an eye bolt 22', is contained the transmission apparatus, which is arranged lengthwise within said case 1. A multicylinder hydraulic pump is generally indicated at 2, and a multicylinder hydraulic displacement motor is indicated at 3.

The driving shaft is formed in two portions, 4 and 32. Portion 32 is hollow and connected to the solid portion 4 by means of a splined zone 66 and 19. The driving shaft also rotates the cylinder block 6 for the multicylinder displacement pump shown generally at 2.

In each cylinder of the pump a piston 41 reciprocates, the rod 42 for which abuts against a ring 44 carried by a wobble plate 5 pivoted on the case 9.

Aligned with the axis of the pump 2 and facing the pump is the multicylinder motor 3, the cylinder block 7 of which is provided with a plurality of cylinders in each of which a piston 52 reciprocates; the rods 53 of these pistons abut against a ring 13 carried by a wobble plate 8 mounted on a reaction shaft 12. Both the plate 5 and the plate 8 are pivoted on the inner rotary case 9 so that they can be tilted, which rotary case is integral with the secondary output shaft 10. The distributor 11 is fixed to the case 9, and the cylinder block 7 for the motor and the cylinder block 6 for the pump are in sliding engagement with the distributor. The reaction shaft 12 is stationary and prevents both the ring 13 against which the motor connecting rods abut, and the motor cylinder block 7 from rotating. The fluid for the hydraulic connection between the displacement pump and the displacement motor is supplied by a rotary pressurizing pump 14. Inside the casing 15 of said pump is a rotor 16 provided with longitudinal radial recesses 17 of trapezoidal cross-section in which the rollers 18 are housed. The rotor 16 is rigidly mounted on shaft 4 by means of a pin 20.

On one end of case 1 is a cover 23 held thereon by means of the bolts 24. A bearing 25 is mounted in the case 1 at the end remote from the cover 23 for journalling the output shaft 10 which is integral with the inner rotary case 9, while the other end of the rotary case 9 is journalled in a bearing 26 arranged within the cover 24.

The inner rotary case 9 is formed of three elements, the central element having substantially the same shape as a hollow cylinder and being provided at its ends with recesses for containing the pivots of the tiltable plates 5 and 8.

The outer surface of the central element 27 of case 9 is provided with elliptical holes 30 to lighten the weight of the rotary mass. At the two ends of the central element 27 are fixed the covers 28 and 29. The cover 28 has an extension which forms the output shaft 10 journalled within the bearing 25 mounted on the case 1. Inside and concentric with extension 10 is a housing 31 for receiving the hollow driving shaft 32. The cover 29 has a collar at its center for journalling the case 9 in the bearing 26. The case 9 is provided with recesses journalling the pivots 33 and 91 of the tiltable plates 5 and 8 against which the connecting rods abut. The wobble plate 5 of the pump is of substantially circular shape and is concave with an inner flat bottom surface. At its periphery there are two extensions 33' extending perpendicular to the plane of the plate from the pivots 33 on both sides of the body of the pump. The extensions 33' are provided at their free end with inwardly turned bosses. When plate 5 is perpendicular to the axis of the shafts, the bosses have no effect on the wobble plate. When wobble plate 5 is tilted, the center of gravity of the extensions 33' moves and creates an unbalanced condition in plate 5. The length and the weight of the extensions 33' and the weight of the bosses are so selected with respect to the weight of plate 5, that the bosses counteract the centrifugal forces produced on plate 5 itself tending to return plate 5 to the perpendicular position particularly when a low pressure exists in the servomotor 148. There is provided the semicircular balancing boss 5' on the outer surface of plate 5.

Two pivots 33 having their axis coplanar with the plane of the plate 5 are mounted on the plate 5 to permit tilting about said pivots.

A sleeve 88 is mounted on each of said pivots 33, and inside the recesses in case 9 are fixed sleeves 89. A ring 90 is interposed between the sleeves 88 and 89 in order to permit the lubrication of the pivots during their swinging movement.

Bored lugs 34 and 35 are mounted on the outer edge of the wobble plate 5 for connecting members 154 of the servomotor and rod 36 respectively to wobble plate 5. Rod 36 connects the tilting wobble plate 5 to the wobble plate 8.

The wobble plate 8, carrying the bearing for the hydraulic motor 3, has a shape substantially similar to that of the wobble plate 5. However, the two extensions 37 on plate 8 are not provided with bosses, and no semicircular boss is provided on the outer surface of the surface of the plate, since the wobble plate 8 has a tendency to reach an inclined position in respect to its axis of revolution.

Only one bored lug 38 is provided at the periphery of the plate 8 for the connection of rod 36 between the wobble plates 5 and 8. Pivots 91 are provided for mounting the plate 8 for tilting, and sleeves 92 and 93 are provided to serve the same purpose as sleeves 88 and 89, and lubricating rings 94 are provided similar to rings 90.

Figure 3:
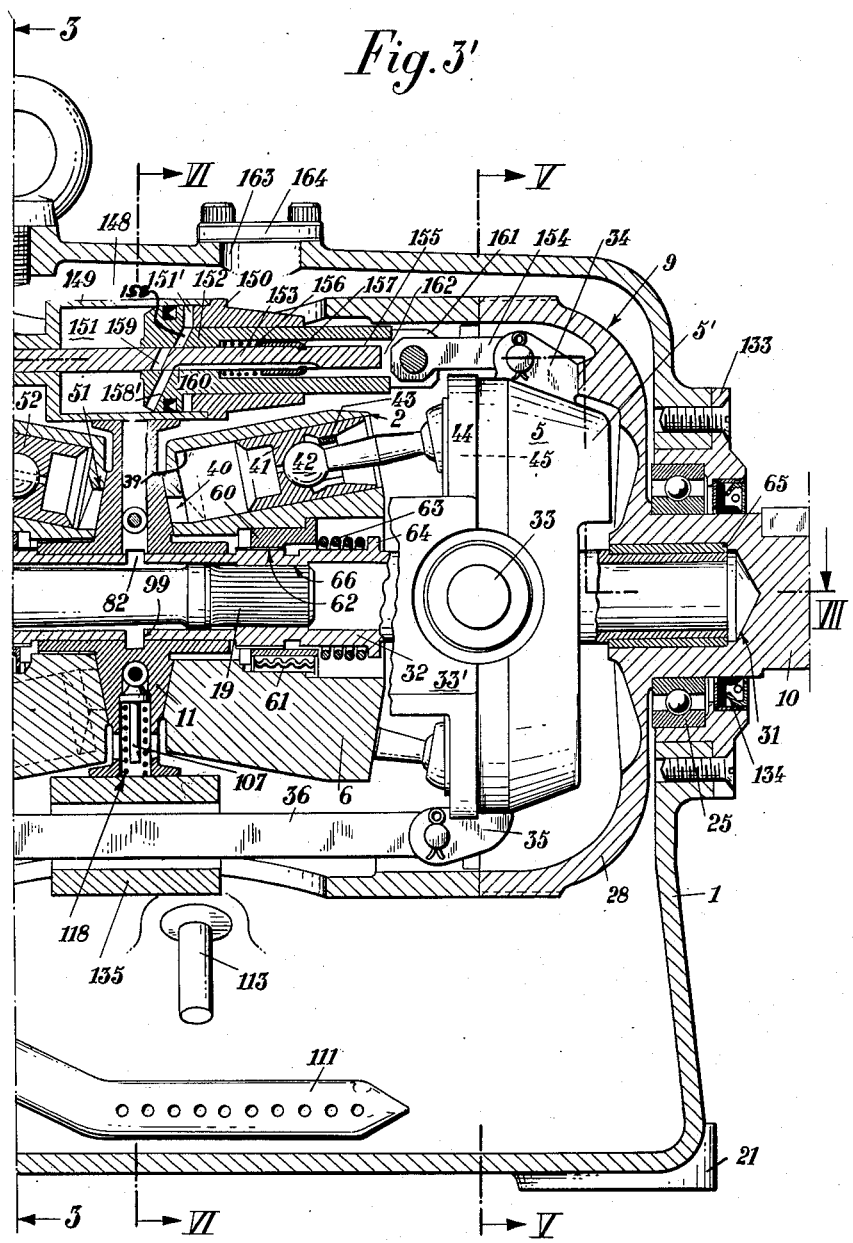
Fig. 3 is a longitudinal elevational sectional view of the device, on an enlarged scale, taken along the line III—III of Fig. 2 (subdivided into two figures, 3 and 3')

The multicylinder displacement pump 2 is arranged inside the inner rotary case 9. This pump comprises a cylinder block 6 for the cylinders, which body abuts against the distributor 11. Said block has a frusto-conical shape, is centrally bored and is provided along an intermediate circumference, with cylindrical bores 39, the axes of which are convergent, i. e. they are parallel to the generatrices of a cone. Said bores do not entend lengthwise through the cylinder block but end a short distance from the base, and holes 40, having a lesser cross-sectional area extend from the bores 39 and are eccentric with respect to the bores 39. The holes 40 have their axes parallel to the axis of the device and constitute fluid admission and exhaust ports for the cylindrical bores 39. The base of the cylinder block 6 is spherically shaped. The cylindrical pistons 41 slide inside the cylindrical bores 39, and are each provided in one end with a recess for reducing their weight and at the other end with a hemispherical housing for the end of a connecting rod 42. The connecting rods 42 have balls on the ends thereof by which they are coupled with the pistons 41 (the connecting rod being held in the recesses in the pistons by the stop rings 43), and with the holding ring 44 as well as the rest ring 45. The ring 45 is contained in the cup-shaped wobble plate 5 and abuts against a ball bearing carried by a ring and against a thrust race supported by the bottom of the plate 5. The holding ring 44, the ring 45 and the ball bearing carrying ring are fixed to each other by means of bolts. The ball bearing, the ring carrying it, the thrust race and the bolts are not shown on the drawing, but they are similar respectively to the ball bearing 57, ball bearing carrying ring 56, the thrust race 58 and the bolts which are illustrated in Fig. 3 for the wobble plate 8 associated with the displacement motor 3.

The multicylinder hydraulic displacement motor 3 has similarly arranged members, except for some details. The motor 3 faces the pump 2 and distributor 11. The cylinder block 7 of the cylinders, although having the same shape as the cylinder block 6 is provided with cylindrical bores 50, the diameter of which is slightly greater than the diameter of the cylindrical bores 39 of the block 6. Furthermore, the holes 51 forming the ports for the fluid and extending from the cylindrical bores 50 have a cross-sectional area which is greater than that of the bores 40 in the block 6. The pistons 52 are arranged similarly to the pistons of the pump 2 (except for the greater size of the pistons 52); also similar are the connecting rods 53, the stop rings 54, the holding ring 55 for the connecting rods, the abutment ring 13 for the connecting rod, the bearing carrying ring 56, the radial ball bearing 57, the thrust race 58 and the bolts 59. These elements 13, 55, 56, 57, 58 and 59 are likewise contained within the cup-shaped swash plate 8. The base of the cylinder block 7 resting on the distributor 11 is spherically shaped.

Inside the central hole in the block 6 for the pump, a housing is provided for a sleeve 60 fixed to said block by means of a pin 61. This sleeve has a splined portion on its inner surface for engaging the splined portion 62 of the hollow driving shaft 32. The sleeve also serves as support member for the spring 63 pressing said block 6 against the distributor 11. The other end of said spring 63 rests against a shoulder 64 on the hollow driving shaft 32.

The hollow portion of the shaft, one end which is inserted within the recess 31 provided in the output shaft 10, with a sleeve 65 between the two shafts, is provided near the other end with an inner splined portion 66, which engages with the splined portion 19 of the driving shaft 4, so that when the shaft 4 is revolving, both the hollow shaft 32 and the block 6 will revolve.

Likewise, inside the central recess of the block 7 for the motor 3, is internally splined sleeve 67, fixed to the body of the cylinders 7 by the pin 68. The splined portion of the sleeve 67 is engaged with a corresponding splined portion 69 of the reaction shaft 12. The sleeve 67 serves as the abutment for the spring 70 biasing the block 7 of the cylinders against the distributor 11. The other end of the spring 70 rests against a shoulder 71 on the reaction shaft 12.

Figure 7:
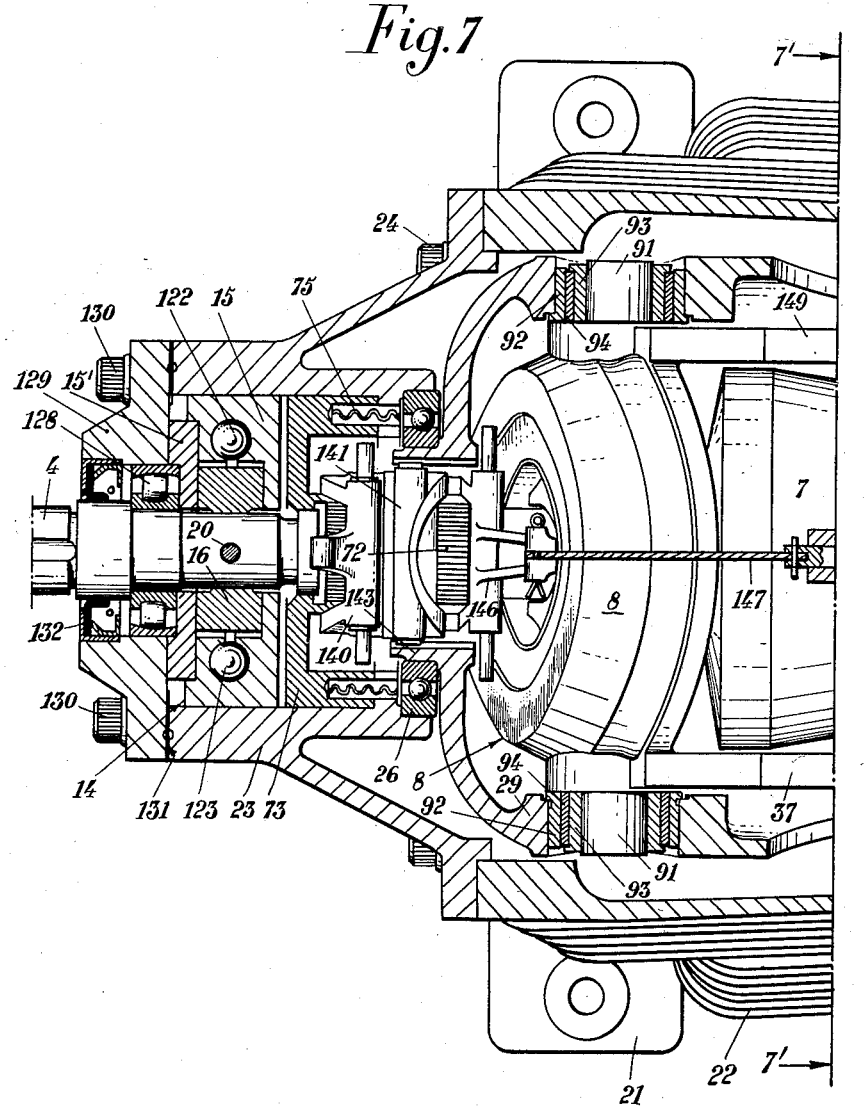
Fig. 7 is a sectional view taken along the line VII—VII of Fig. 3 (subdivided in two figures, 7 and 7').
Figure 7:
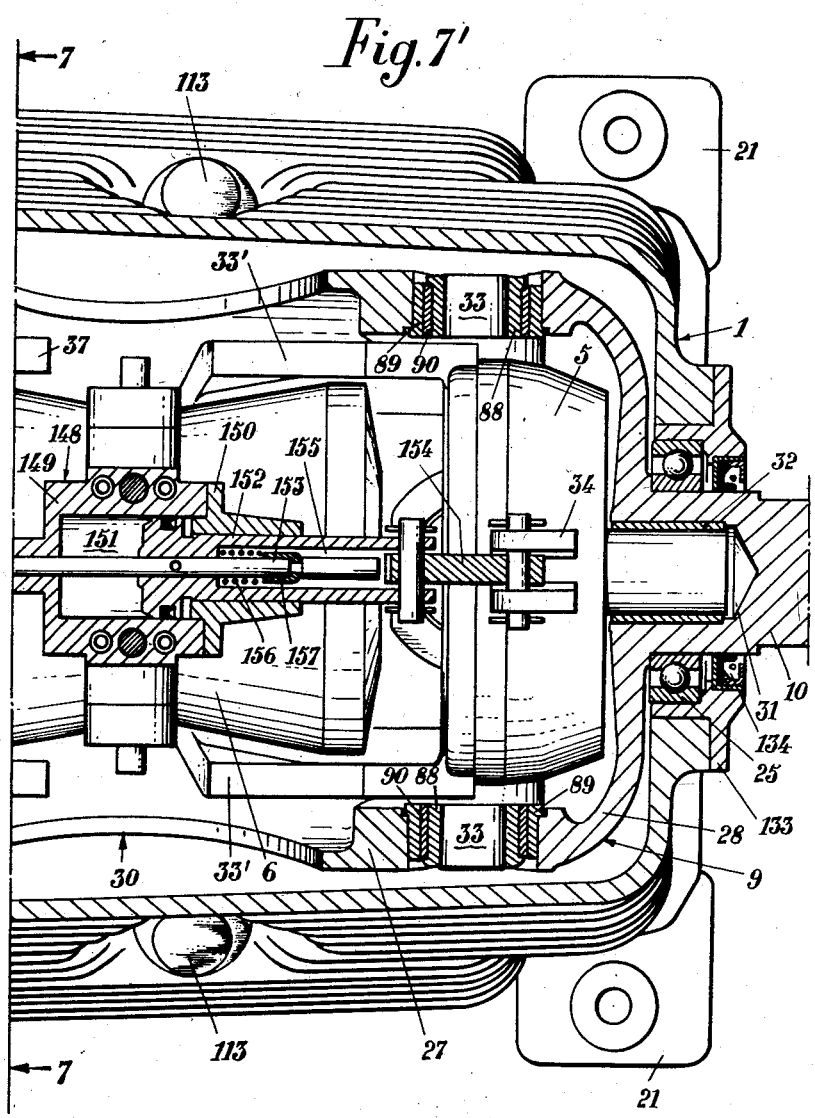

The reaction shaft 12 is provided at its outer end with a splined portion 72 for engagement with the inner splined portion 74 in the center of the reaction flange 73. This flange 73 is rigidly fixed to the cover 23 by means of screws 75, the reaction shaft 12 thereby being prevented from rotating. The shaft 12 is provided, near the middle of its length, with pivots 76 for connection of said shaft to the coupling 77. The coupling 77 prevents the ring 13 on which the connecting rods rest, from rotating, while said joint permits said ring to be tilted by the plate 8, by means of the lateral pivots 91 (Fig. 7).

When the pistons 52 of the motor 3 reciprocate due to the action of the fluid delivered by the pump 2, assuming the wobble plate 8 is not tilted to its limit position, the plate 8 is caused to revolve in order to cause the outflow of the fluid from the cylinders 50, while both the ring 13 and the ring 56, carrying the bearings, are stationary. The relative revolution between the stationary and revolving members is helped by the bearings 57 and 58. Thus, the joint 77 swings slightly about the pivots 76, the lubrication of said pivots on which the sleeves 79 are mounted being helped by the rings 80 interposed between said sleeves 79 and the sleeves 81 on the joint 77.

The ring 45 against which the connecting rods abut is connected with the driving hollow shaft 32 in like manner. The hollow driving shaft 32 is provided, near the middle of its length with pivots 83 for connection of plate 5 with the coupling 84. The coupling 84 rotates the ring 45 against which the connecting rods abut, with the shaft 32, while said joint allows the ring to be swung by the wobble plate 5 about pivots 85.

The joint 84, during the motion, is slightly swung about the pivots 83, and the lubrication of said pivots, on which the sleeves 86 are fixed, is helped by the rings 87 interposed between said sleeves 86 and the sleeves 86' mounted within the joint 84.

Thus, when the hollow driving shaft rotates, ring 45 against which the connecting rods abut also rotates and may be tilted with the plate 5, but with a relative movement with respect to the wobble plate 5 which, being pivoted on the inner rotary case 9, rotates along with the driven shaft 10.

The distributor 11 is centrally mounted between the pump cylinder block 6 and the motor cylinder block 7. The distributor is centrally bored to permit the passage both of the reaction shaft 12 and the hollow driving shaft 32, the ends of which are flush with a recess 82 in said distributor 11. The side surfaces of the distributor are substantially spherical to fit the spherical concave recesses in the bases of the pump cylinder block 6 and the motor cylinder block 7. These cylinder blocks are pressed against the distributor 11 by the respective springs 63 and 70.

The distributor 11 is rigidly fixed to the extensions 95 on the rotary case 9 by means of the bolts 96. The distributor is provided with recesses 97 and 98 in the shape of portions of annular rings which are connected to each other. The recesses are arranged along an inner circumference of the distributor and form the fluid distribution ports between the pump and the motor.

The supplemental fluid supplied by the pressurizing pump 14 is conducted to the duct 99 provided in the distributor by being passed through the clearance existing between the driving shaft 4 and the reaction shaft 12, and it enters the distributor in register with the above mentioned recess 82. The supplemental fluid compensates the fluid shortages in the hydraulic circuit between the motor and the pump which are due to leakage. Thus the formation of air bubbles is avoided. Furthermore, said supplemental fluid does not reach the clearance between the spherical joints, as the fluid is admitted to that portion of the hydraulic circuit where a pressure lower than that of the remaining portion of the circuit prevails. To accomplish this a valve system is provided at one of the ends of said recesses 97 and 98. This system comprises two cylindrical valves 100 and 101, forming a closing plug for the connection from the duct 99 to the recesses 97 and 98, respectively. Valves 100 and 101 are arranged in opposed positions with respect to the sides of the duct 99 and the axes of said valves are aligned. The holes are closed or opened by moving the valves in their axial direction. Each valve is provided with a radial seal as well as with a front seal. The radial seal is a cylindrical portion 165 or 167, respectively, which cooperates with a cylindrical seat in the bore for the valves. The front seal is formed by a cylindrical thickening 166 or 168, respectively, which cooperates with a shoulder in the bore for the valve. At the rear of each valve, a spring 169 or 170, respectively, causes the valve to be closed if the differential pressures acting on the opposite sides of the valve are not sufficient to close the valve. This condition can occur at low rates of speed. This arrangement allows the fluid coming in from the duct 99 to open that valve behind which prevails a pressure lower than that of the fluid supplied by the pressurizing pump. The second valve is held closed by the pressure existing in the recess behind the valve which is greater than the pressure existing in the duct 99.

Figure 6:
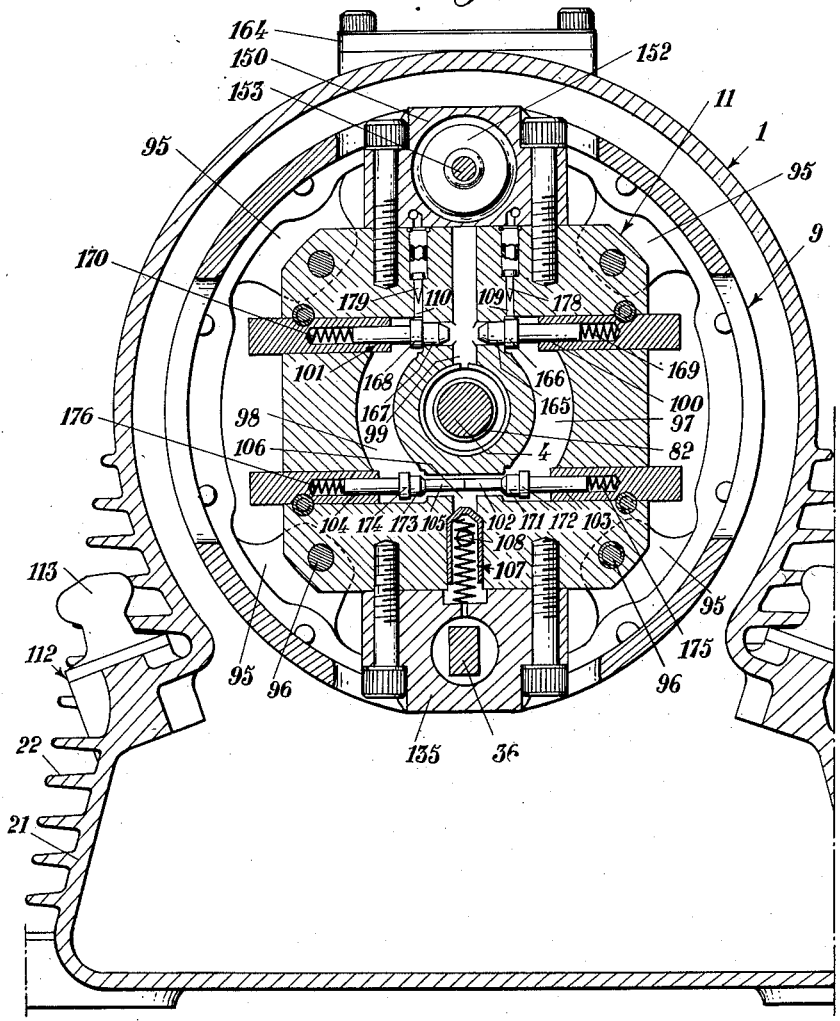
Fig. 6 is a sectional view taken along the line VI—VI of Fig. 3.

With reference to Fig. 6, assuming that in the recess 97 a pressure prevails which is higher than that delivered by the pressurizing pump and prevailing in the duct 99, the valve 100 will be held closed thus closing the connection between the recess 97 and the duct 99. Simultaneously the valve 101 will be opened, behind which, in the recess 98 there prevails a pressure which is lower than that prevailing in the duct 99, and therefore the fluid will be able to travel from the duct 99 to the recess 98. Obviously, the reverse operation will occur if there prevails in the recess 98 a pressure greater than that prevailing in the recess 97.

With further reference to the conditions shown in Fig. 6, the higher pressure existing in the recess 97 with respect to the pressure of the fluid delivered by the pressurizing pump, i. e. the pressure at 99 and 98, will hold closed a cylindrical valve 103, arranged at the other end of the recess 97 and forming part of a system of valves arranged in a manner similar to the system comprised of the valves 100 and 101. The second system comprises the valves 103 and 104, the shape of which is similar to the shape of the valves 100 and 101.

The valves 103 and 104 are provided with a double radial and a front seal. The radial seals are formed by cylindrical portions 171 and 173, and the front seals by thickened portions 172 and 174. Radial seals 171 and 173 cooperate with cylindrical ducts 175 and 176, and the front seals cooperate with shoulders 177 and 178. To the rear of each valve, spring 175 and 176, causes the valves to be closed when the differential pressures acting on the opposite ends of the valves are not sufficient to close the valves at low speeds. The ends of the valves facing the exhaust duct 106 are provided with stems 102 and 105, respectively, so that when one of the valves is closed, said valve causes the other valve to open.

The valve 103 holds the valve 104 open by means of the distancing member formed by the two stems 102 and 105, and the recess 98 is thereby connected with the exhaust duct 106. In this way the excess of fluid eventually entering the recess 98 discharges through duct 106 and also has a certain cooling effect on the unit. Exhaust takes place if the pressure on the front of the valve 107 exerts a thrust which is greater than that exerted on the rear of said valve by the gauged spring 108.

Associated with the ducts where the valves 100 and 101 are mounted, and at right angles to said ducts, are provided the ducts 109 and 110 for sending the fluid to the control jack 148 for slanting the plates 5 and 8.

Said ducts are controlled by the needle check valves 178 and 179 respectively, which valves are each provided with a radial and front seal.

The distributor 11 is rigidly connected to the inner rotary case 9, and therefore said distributor revolves both with respect to the pump cylinder block 6 and with respect to the motor cylinder block 7. The recesses 97 and 98 during the relative revolution, connect the cylinders 39 of the pump and to the cylinders 53 of the motor, and the fluid pumped by the pistons of the pump 2 operate under predetermined conditions the pistons of the motor 3.

A counter-weight 135 is mounted on the lower portion of the distributor for compensating, when the case 9 is revolving, the unbalance due to the servomotor which is diametrically opposite to said counter-weight 135.

Figure 4:
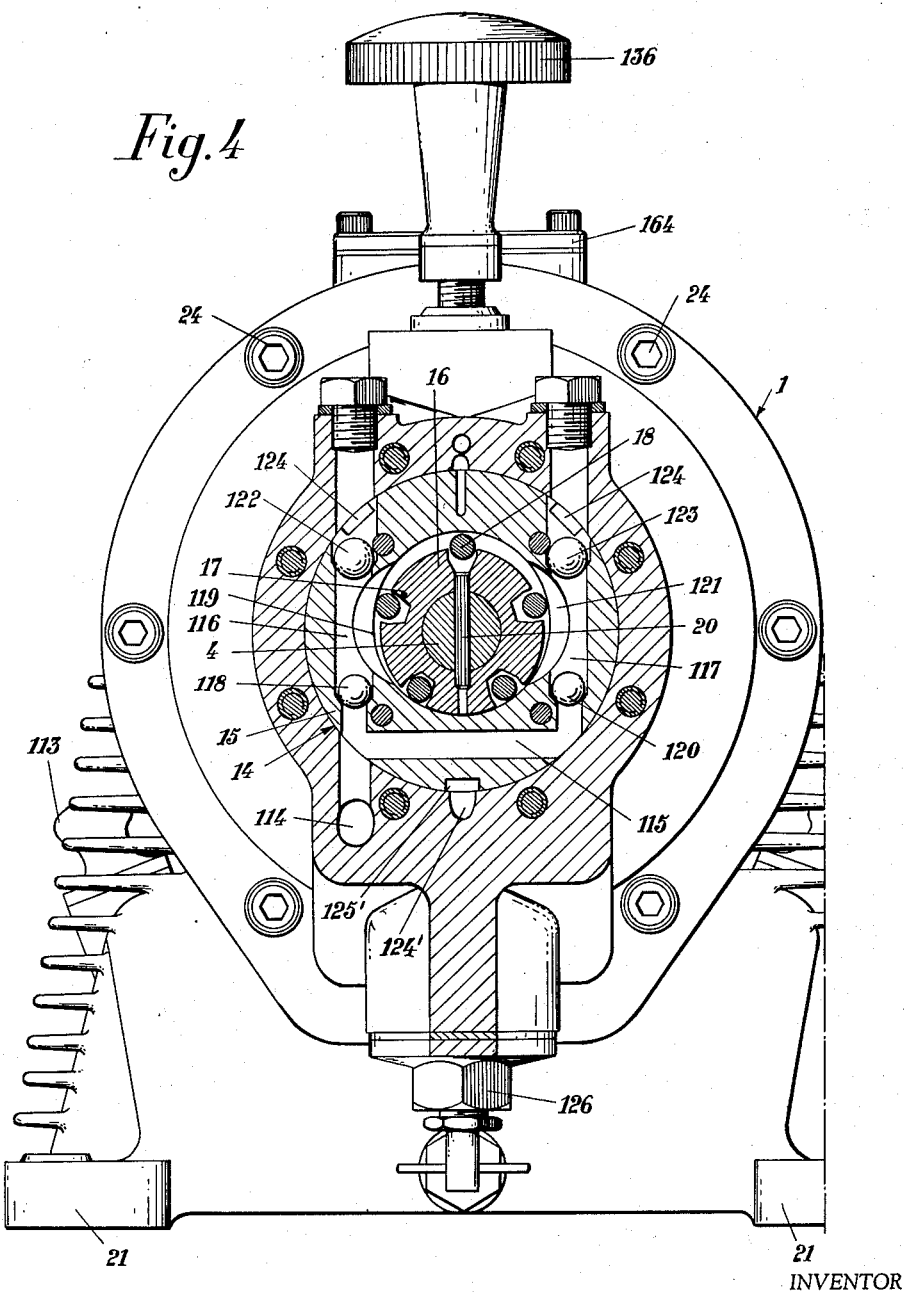
Fig. 4 is a sectional view taken along the line IV—IV of Fig. 3.
Figure 5:
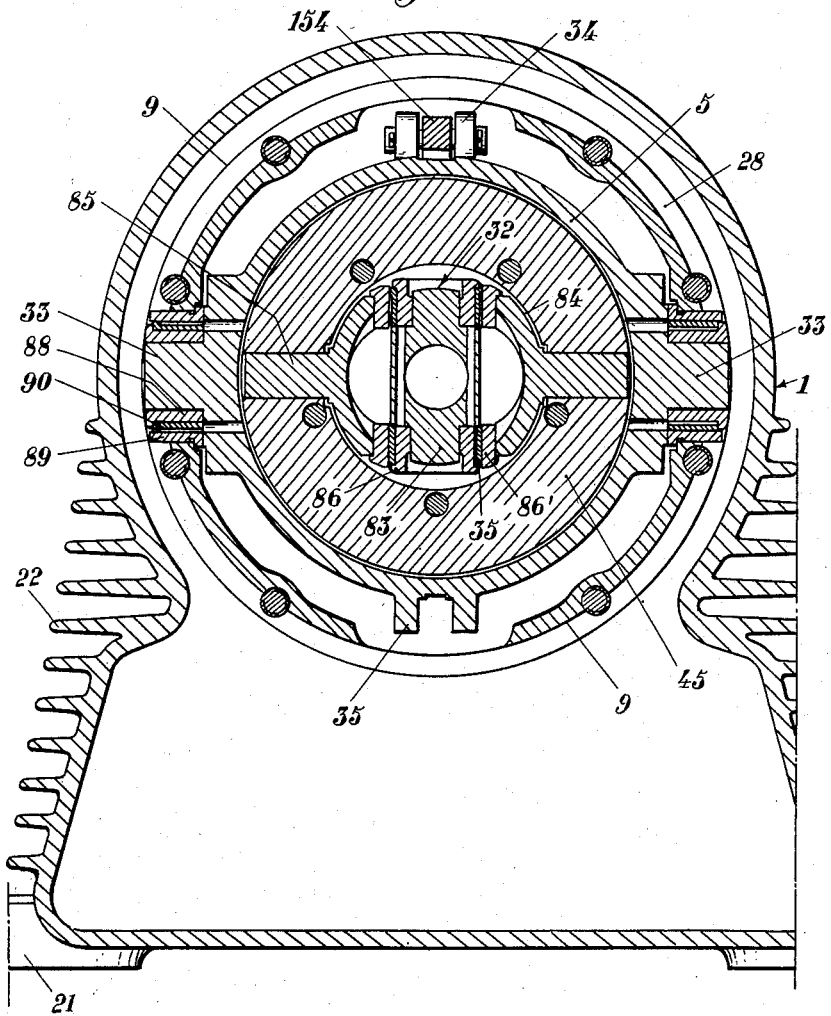
Fig. 5 is a sectional view taken along the line V—V of Fig. 3.

The pressurizing pump 14 supplies the supplemental fluid. The rotor 16 of the pump is fixed on the driving shaft 4 and is revolved by this shaft (Fig. 4). Within the body 15 of the pump, which is closed by a cover 15', is arranged a plurality of ducts each provided with ball check valves. These ducts serve to feed the fluid to the pump and for the delivery of the fluid from the pump. The fluid is taken up by the pump by means of a suction pipe 111 which extends into the base of the case 1, wherein a reservoir of the fluid is maintained by causing the fluid to enter the case through the holes 112, these holes being closed by the plugs 113.

The fluid passes from the suction pipe 111 to a duct 114 provided in the cover 23. From said duct 114 the fluid enters the duct 115 in the body 15 of the pressurizing pump. Depending on the direction of rotation of the driving shaft 4, i. e. of the rotor 16 of said pump 14, the pump will produce a suction either in the duct 116 or in the duct 117, in duct 116 for a clockwise rotation and in duct 117 for a counterclockwise rotation of the rotor 16. When the suction occurs in the duct 116 (Fig. 4) i. e. when the rotor 16 is revolving in a clockwise direction, the ball valve 118 will be opened and therefore the fluid will travel up to the recess 119. Simultaneously, due to the pressure created by the delivery of the pump, the valve 120 in the passage from the duct 117 to the duct 115 will be closed. When suction occurs in the duct 117, i. e. when the rotor 16 is revolving counterclockwise, the ball valve 118 will be closed due to the pressure in recess 119.

The pressure or the vacuum in the ducts 116 or 117 determines which of the ball check valves 122 and 123 will be open or closed, and from these valves the fluid flows into the ducts 124, 125 and 125' provided in the body of the pump 15 and in the cover 15'. From the duct 125', the fluid flows into the duct 124', from which the fluid is caused to pass through a filter 126, of a known kind, mounted within a recess in said cover. Beyond the filter, the fluid flows through the passage 127 provided between the reaction flange 73 and the body 15 of the pump, reaches the clearance between the driving shaft 4 and the reaction shaft 12, and lastly flows through the recess 82 and reaches the duct 99 of the distributor 11.

The driving shaft 4 is journalled in a bearing 128 which is held in the cover 23 by means of an oil retaining flange 129 fixed to said cover 23 by means of the screws 130 and having a packing 121 therein. A sealing ring 132 prevents the oil from flowing out along the periphery of the driving shaft 4.

The output shaft 10 is supported in the case 1 by means of a ball bearing 25, held by a flange 113, and having a sealing ring 134 therearound.

The control device for the tilting of the wobble plates comprises several elements which are mechanically connected together. The manual control is carried out by means of a hand-wheel 136, which operates a control screw 137 rotatable within a screw threaded sleeve 138 fixed to the cover 23. The end 139 of the threaded stem 137 is thus raised or lowered according to the direction of the rotation imparted to the hand-wheel 136. When the end 139 is lowered, it lowers the arm of a control lever 140. The lever is provided with two arms, and is pivoted at its center on the reaction flange 73. The other arm of the lever 140, which is at substantially right angles to the first arm, is a fork encompassing the reaction shaft 12. When the first arm is lowered, said fork is displaced forwardly along said reaction shaft in order to move a thrust ring 141 forward. The outer side of the thrust ring is provided with a surface suitable to assist the thrust provided by the prongs of the fork. The inner surface of said thrust ring is splined in order to move on the splined portion 72 of the reaction shaft 12, so that reaction shaft prevents the ring from revolving. The ring 141 is guided in its displacement by a ring 142 sliding within an extension 143 forming the bearing for the inner rotary case 9 within the bearing 26. In turn, the ring 142 during its motion presses against a control-return lever 144. The lever 144 is provided with a fork shaped end encompassing the reaction shaft 12. This lever is pivoted on a projection 145 on the rotary case 9. One arm 146 of the lever 144 acts on the link 147 controlling the servomotor 148.

The servomotor 148 is a double acting follow-up type and comprises a hollow body 149, closed by a plug 150 and having a cylindrical recess 151 inside the body 149. Within the recess 151 and said plug 150 is a slidable piston 152. The body 149 of the servomotor has lugs thereon for rigidly connecting it to the case 9.

The piston 152 has a longitudinal bore therein, as does the bottom of the body 149 in order to permit a distributor plunger 153 to pass slidably therethrough. The plunger is connected to the link 147 by means of a pivot and a pin. Two lugs 161 are provided on the stem of the piston 152 to which is pivotally connected the connecting rod 154, the other end of said connecting rod being pivoted on the extension 34 of the wobble plate 5.

Within the recess 155, defined by the longitudinal bore, the piston 152 and around the distributor plunger 153 is arranged a spring 156 for moving the distributor plunger 153 to the right in Fig. 3, one end of said spring being held by a bushing 157 fixed to the distributor plunger 153, and having its other end against a shoulder within the recess 155 of the piston 152. The piston 152 is provided with an oblique transverse hole formed by two ducts 158 and 158' separated by the rod of the distributor plunger 153. The distributor plunger 153 is also provided with an oblique hole 159, so that when the holes 158, 158' and 159 are aligned, they determined a continuous duct. A longitudinal recess 160 is provided along a part of the length of the distributor plunger 153 on the side turned towards the hole 158' and in the same plane as the hole 158'.

Having thus described the component parts of the servomotor 148, the operation thereof is as follows:

Fluid from the ducts 109 and 110 of the distributor 11 (Fig. 6) is admitted into the part 151' of the recess 151 and at the right or inner side of the head of the piston 152. In space 151' the pressure of the fluid is determined by the displacement pump 2. A movement towards the left side of Fig. 3 of the link 147, caused by the operation of the hand-wheel 136, causes the distributor plunger 153 to be drawn to the left, and assuming that the initial conditions are as depicted in said Fig. 3, the duct 158' will be aligned with the recess 160. The fluid contained in space 151 will then travel through the duct 158', the recess 160, the hole 155 and will be exhausted outside the servomotor through the opening 162 provided in the end of piston 152. The fluid under pressure at 151', acting on the inner surface of the head of the piston 152, causes the piston 152 to be displaced towards the left side of Fig. 3, and this displacement will continue until the duct 158', due to the displacement of the piston 152, to the left, is out of alignment with the recess 160, i. e. when the duct 158' faces the solid portion of the distributor plunger 153, intermediate the hole 159 and the recess 160. The piston 152 cannot move to the left beyond this position since the fluid at 151', due to the alignment of the holes 158, 159 and 158' produced by the movement, flows into the space 151, and therefore the pressure at 151 is equal to that existing at 151'. The difference of the areas of the opposite surfaces of the head of the piston 152 (the surface facing the space 151' having less area, due to the presence of the rod of the piston 152), would cause a greater thrust from the direction of the space 151, with a consequent thrust of the piston 152 towards the right side of Fig. 3. Therefore a balance position for the piston 152 is reached at the aforesaid intermediate point( corresponding to the position shown at Fig. 3), i. e. when the duct 158' is aligned with the solid portion of the distributor plunger 153, between the duct 159 and the recess 160.

The distributor plunger 153 is again caused to move toward the right side of Fig. 3 by the expansion of the spring 156, which spring was compressed by the previously described operation. However the spring will be operative only when a manual movement of hand-wheel 136 in a direction opposite to the action previously carried out is performed. By this displacement of the distributor plunger to the right, the hole 159 becomes aligned with the holes 158 and 158' and therefore the fluid in the recess 151 having a pressure equal to that existing at 151', causes the piston 152 to be moved to the right until the above described equilibrium position is reached, said position corresponding to that established by the distributor plunger 153.

The equilibrium position of the piston 152 is always reached when the hole 158' is in an intermediate position between the duct 159 and the recess 160. Therefore, for each position of the distributor plunger 153 there is a corresponding position of the piston 152.

The fluid contained inside the recess 151 flows at a particular position of the distributor plunger 153, through the duct 158' and is discharged through the opening 162. It is to be noted that the duct 158', the intake end of which faces toward that portion of the recess 151 which is nearer to the axis of rotation of the apparatus, is positioned to allow any air contained within the recess 151 to be exhausted. This air is collected near the intake end of the duct 158' because due to the rotary movement of the cylindrical case 9 and of the servomotor 148 connected thereto, the fluid, under the effect of the centrifugal force tends to be collected towards the outmost portion of said recess 151 with respect to the axis of rotation of the apparatus. Therefore such an arrangement allows the air eventually collected in the recess 151, to be drained off before the fluid, since said air would be harmful to the operation of the servomotor.

The operation of the distributor plunger 153, and the consequent corresponding movement of the piston 152 causes movement of the connecting rod 154 and a resulting tilting of wobble plate 5. The position of plate 5 can thus be varied from a position at right angles to the axis of rotation of the apparatus to an oblique position with respect to said axis.

The connecting rod 36 between the wobble plates 5 and 8 transmits the movement of plate 5 to the plate 8. The connecting rod 36 is of a length such that when the plate 5 is at right angles to the axis of rotation, the plate 8 is in the maximum tilted position with respect to its axis of rotation, and vice versa.

When the wobble plate 5 is at right angles to the axis of rotation, the pump delivers no fluid to the motor since the pistons 41 are not caused to reciprocate. The hydraulic motor, although the wobble plate 8 is at its maximum tilted with respect to the axis, will receive no fluid and therefore its pistons 52 will be stationary. In this position of the plate 5, as the pistons of both the pump and of the motor do not reciprocate, the plates 5 and 8, connected to the case 9 and to the output shaft 10 do not rotate, i. e. the output shaft will be stationary and the apparatus will be idling.

If the wobble plate 5 is tilted through a certain angle less than the maximum angle, the pistons of the pump 2, when the cylinder block rotates, will reciprocate, and their stroke will be a function of the inclination. The fluid will be delivered to the bores 50 of the cylinders of the motor 3, causing the inner case 9 to rotate. The cylinder block 7 as well as the connecting rods 53 are prevented from rotating by the reaction shaft 12 which is always stationary. The inner case 9 is rigid with the output shaft 10 and therefore the output shaft will rotate at a greater or lesser rate of speed depending on the slant of the plate 5, i. e. on the stroke volume of the pump. The quantity of fluid supplied by the pump is a function of the stroke volume and of the relative rotation between the cylinder block 6 which is fixed to the driving shaft, and the case 9, which is secured to the output shaft 10, i. e. of the relative rotation between the driving shaft and the driven shaft. The quantity of fluid supplied will be taken up by the hydraulic motor. Thus, for a given number of revolutions of the driving shaft, the number of revolutions of the driven shaft depends upon the ratio between the stroke volume of the motor and the stroke volume of the pump, said volumes being determined by the angle of the plates 8 and 5, with respect to the axis of rotation of the apparatus.

At the other limit position of the wobble plates, i. e. when the wobble plate 5 is at its maximum angle with respect to the driving shaft, while the plate 8 is at right angles to the axis of rotation, the pump will deliver no fluid even if the angle of tilt of the wobble plate 5 permitted a maximum stroke for its pistons. This is due to the fact that the position of the plate 8 does not allow the reciprocation of the pistons, i. e. prevents the motor from receiving the fluid from the pump, and therefore the pump, as it has its pistons blocked by the fluid which cannot flow out of the bores of the cylinders, rotates the wobble plate 5, i. e. the inner case 9, transmits all of the revolutions of the driving shaft, so that the transmission ratio of the driving shaft with respect to the driven shaft will be 1:1.

In the upper portion of the case 1 is provided a hole 163, having a cover 164. This permits the application of a tachometer to the rotary case 9 for measuring the number of revolutions of the output shaft 10.

A hydraulic control can be substituted for the control hand-wheel 136, said hydraulic device controlling the screw threaded stem 137 and being fed with fluid which can be supplied by the pressurizing pump 14. The hydraulic device may be provided with electromagnetic devices for its remote control and for the consequent remote control of the ratios of the rates of speed of the driving shaft and of the driven shaft of the transmission apparatus.

I claim:

1. In a hydraulic speed change device particularly for industrial use which has an outer stationary housing, an inner casing rotatably mounted therein and having a driven shaft on one end thereof, a stationary hollow reaction shaft fastened to the said stationary housing, a driving shaft having a first section rotatably mounted in said outer housing and rotatable inside the said reaction shaft and a second section formed as a hollow driving shaft journaled in the said inner casing in the part thereof formed as a driven shaft, a multicylinder hydraulic pump inside said inner casing having a cylinder body connected for rotation to the said hollow section of the driving shaft, a multicylinder hydraulic motor inside said casing coaxial with the multicylinder hydraulic pump and having the cylinder body mounted on the stationary reaction shaft, pistons reciprocating in said cylinders of the pump and motor bodies, piston rods carried by said pistons, a wobble plate associated with the pump against which abut the piston rods of the pump pistons, a wobble plate associated with the motor against which abutment the piston rods of the motor pistons, said wobble plates being pivoted to the inner casing and being interconnected to swing complementally with respect to each other, and a distributor interposed between the pump cylinder body and motor cylinder body for hydraulically interconnecting said pump and said motor, that improvement comprising a double acting follow-up servomotor fastened to said distributor and connected to the wobble plate associated with the pump and operable from outside of the housing to control the slope of the wobble plate associated with the pump, and through the latter the slope of the wobble plate associated with the motor, and two extensions on said wobble plate associated with said multicylinder pump, said extensions extending perpendicular to the plane of said wobble plate from the pivotal axis thereof and having bosses on the ends thereof for tending to tilt said wobble plate during the rotation thereof.

2. The improvement as claimed in claim 1 wherein the servomotor comprises, in combination, a cylinder adapted to be fastened to said distributing plate and having a bored plug in the open end thereof, a piston slidable in said cylinder and having an axial bore therein, said piston having a stem passing through said plug for connection at its free end to the wobble plate associated with said multicylinder pump, an oblique bore passing transversely through said piston, said oblique bore having two sections separated from each other by said axial bore of the piston, said oblique bore forming communication between the inside of the cylinder and the space defined between the outer face of the piston and the inner face of the plug, means for connecting said space with the delivery side of the multicylinder pump, a spring biased distributor plunger in said axial bore of the plug, said plunger passing through the bottom of the cylinder, a link to which said plunger is connected, and means operable from the outside of the housing operatively connected to the said link said means being arranged to cause a longitudinal displacement of said plunger in either direction, whereby liquid pressure from the delivery side of said multicylinder pump selectively operates on one side of said piston.

3. A device as claimed in claim 2, wherein the distributor plunger is also provided with an oblique bore having the same inclination as the two sections of the oblique bore of the piston and further provided with a longitudinal recess on the outer surface of the plunger at the side of the lower section of the two sections of the oblique bore of the piston and in the same plane as the said lower section of bore, said recess being separated from the oblique bore of the plunger by a length of the outer surface of the plunger.

4. A device as claimed in claim 2, wherein the lower section of the oblique bore of the piston opens in the portion of the cylinder wall nearer to the axis of rotation of the device, whereby said lower section of the oblique bore serves to remove air which penetrates into the cylinder and collects near the opening of the oblique bore toward the outside of the cylinder during the rotation of the device.

References Cited in the file of this patent

UNITED STATES PATENTS

| | | |
|---|---|---|
| 1,840,872 | Rayburn | Jan. 12, 1932 |
| 2,211,402 | Benedek | Aug. 13, 1940 |
| 2,296,929 | Ifield | Sept. 29, 1942 |
| 2,371,974 | Neuland | Mar. 20, 1945 |
| 2,389,186 | Dodge | Nov. 20, 1945 |
| 2,583,656 | Lay | Jan. 29, 1952 |
| 2,670,715 | Conway | Mar. 2, 1954 |
| 2,687,049 | Ebert | Aug. 24, 1954 |

FOREIGN PATENTS

| | | |
|---|---|---|
| 23,390 | Australia | July 6, 1935 |
| 479,686 | Italy | Apr. 10, 1953 |